United States Patent
Kim et al.

(10) Patent No.: US 12,351,715 B2
(45) Date of Patent: Jul. 8, 2025

(54) THERMOPLASTIC RESIN COMPOSITION AND MOLDED PRODUCT USING SAME

(71) Applicant: LOTTE CHEMICAL CORPORATION, Seoul (KR)

(72) Inventors: Kyoungju Kim, Uiwang-si (KR); Semi Kim, Uiwang-si (KR); Keehae Kwon, Uiwang-si (KR); Younghyo Kim, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 747 days.

(21) Appl. No.: 17/764,619

(22) PCT Filed: Sep. 29, 2020

(86) PCT No.: PCT/KR2020/013392
§ 371 (c)(1),
(2) Date: Mar. 29, 2022

(87) PCT Pub. No.: WO2021/066556
PCT Pub. Date: Apr. 8, 2021

(65) Prior Publication Data
US 2022/0340749 A1    Oct. 27, 2022

(30) Foreign Application Priority Data

Sep. 30, 2019 (KR) .......... 10-2019-0121102
Sep. 25, 2020 (KR) .......... 10-2020-0125057

(51) Int. Cl.
*C08L 69/00* (2006.01)

(52) U.S. Cl.
CPC .......... *C08L 69/00* (2013.01); *C08L 2205/03* (2013.01)

(58) Field of Classification Search
CPC .......... C08K 3/013; C08K 5/524; C08K 3/34; C08K 3/346; C08K 5/529; C08L 2205/03; C08L 25/12; C08L 51/04; C08L 55/02; C08L 69/00
See application file for complete search history.

(56) References Cited

U.S. PATENT DOCUMENTS

| | | |
|---|---|---|
| 2008/0004373 A1 | 1/2008 | Volkers et al. |
| 2010/0222486 A1 | 9/2010 | Matsuno et al. |
| 2011/0028615 A1 | 2/2011 | Li et al. |
| 2014/0076616 A1 | 3/2014 | Meng et al. |
| 2014/0200303 A1 | 7/2014 | Steendam et al. |
| 2015/0183895 A1 | 7/2015 | Woo et al. |
| 2016/0024301 A1 | 1/2016 | Hayashida |
| 2016/0304713 A1 | 10/2016 | Bai et al. |
| 2017/0313870 A1 | 11/2017 | Kim et al. |

FOREIGN PATENT DOCUMENTS

| | | |
|---|---|---|
| JP | 2010-155922 A | 7/2010 |
| JP | 2012-241089 A | 12/2012 |
| KR | 10-2011-0072491 A | 6/2011 |
| KR | 10-2014-0091722 A | 7/2014 |
| KR | 10-2015-0014983 A | 2/2015 |
| KR | 10-2015-0058321 A | 5/2015 |
| KR | 10-2015-0076650 A | 7/2015 |
| KR | 10-2015-0104629 A | 9/2015 |
| KR | 10-2015-0132087 A | 11/2015 |
| KR | 10-2016-0075762 A | 6/2016 |
| KR | 10-1954063 B1 | 3/2019 |
| WO | 2009-051264 A1 | 4/2009 |
| WO | 2021/066556 A1 | 4/2021 |

OTHER PUBLICATIONS

International Search Report in counterpart International Application No. PCT/KR2020/013392 dated Jan. 18, 2021, pp. 1-3.

*Primary Examiner* — Ana L. Woodward
(74) *Attorney, Agent, or Firm* — Additon, Pendleton & Witherspoon, P.A.

(57) ABSTRACT

The present invention relates to a thermoplastic resin composition, and to a molded article using the same, wherein the thermoplastic resin composition includes: 100 parts by weight of a base resin including (A) 30 to 50 wt % of a polycarbonate resin, (B) 20 to 30 wt % of a rubber-modified aromatic vinyl-based graft copolymer, and (C) 20 to 50 wt % of an aromatic vinyl-vinyl cyanide copolymer; and (D) 5 to 15 parts by weight of an inorganic filler having an average particle diameter (D50) of 3 to 6 μm; and (E) 0.2 to 0.5 parts by weight of a compound represented by Chemical Formula 1.

[Chemical Formula 1]

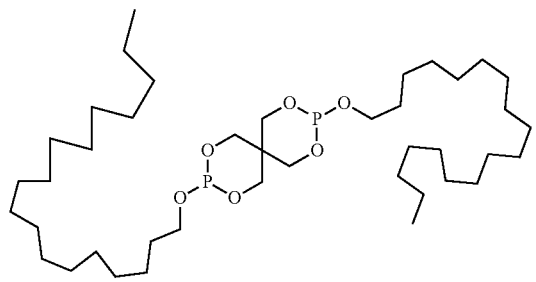

15 Claims, No Drawings

THERMOPLASTIC RESIN COMPOSITION AND MOLDED PRODUCT USING SAME

CROSS-REFERENCE TO RELATED APPLICATIONS

This application claims priority to and the benefit of International Application No. PCT/KR2020/013392, filed Sep. 29, 2020, which published as WO 2021/066556 on Apr. 8, 2021; Korean Patent Application No. 10-2019-0121102, filed in the Korean Intellectual Property Office on Sep. 30, 2019; and Korean Patent Application No. 10-2020-0125057, filed in the Korean Intellectual Property Office on Sep. 25, 2020, the entire disclosure of each of which is incorporated herein by reference.

TECHNICAL FIELD

A thermoplastic resin composition and a molded article using the same are disclosed.

BACKGROUND ART

A polycarbonate resin is one of engineering plastics, and is a material that is widely used in the plastics industry.

The polycarbonate resin has a glass transition temperature (Tg) of about 150° C. due to a bulk molecular structure, such as bisphenol-A, which shows high heat resistance and may be an amorphous polymer having excellent transparency.

Furthermore, although having excellent impact resistance and compatibility with other resins, the polycarbonate resin has a drawback of low fluidity, so it is frequently used in a form of an alloy with various resins for complementing moldability and post-processability.

Among them, a polycarbonate/acrylonitrile-butadiene-styrene copolymer (PC/ABS) alloy has excellent durability, moldability, heat resistance, impact resistance, and the like and reliability against thermal impact, and thus may be applied in a wide range of applications such as an electrical/electronic field, an automobile field, a construction field, and other daily life materials, for example as a resin composition for plating and molded articles thereof applicable to an electrical/electronic field, an automobile field, a construction field, and other daily life materials.

In order to improve various physical properties of the molded articles composed of the PC/ABS alloy, a content of the polycarbonate and/or acrylonitrile-butadiene-styrene copolymer may be adjusted, or various additives (e.g., various fillers) are added thereto. However, when the content of the polycarbonate and/or acrylonitrile-butadiene-styrene copolymer is adjusted, various physical properties may be balanced within predetermined ranges, but physical properties may not be clearly improved by adjusting the content.

In addition, the various fillers added to the PC/ABS alloy may cause deformation of the polycarbonate and/or acrylonitrile-butadiene-styrene copolymer constituting the base resin. For example, the fillers cause decomposition of the polycarbonate and thus may deteriorate various physical properties such as impact resistance, thermal stability, and the like of molded articles and secondary processability such as plating properties and the like. Accordingly, required are a thermoplastic resin composition including the various fillers but still exhibiting excellent physical properties and a molded article using the same.

DISCLOSURE

Description Of The Drawings

Technical Problem

The present invention provides a thermoplastic resin composition capable of exhibiting excellent physical properties even including various fillers, and a molded article using the same.

Technical Solution

According to an embodiment, a thermoplastic resin composition includes: 100 parts by weight of a base resin including (A) 30 to 50 wt % of a polycarbonate resin, (B) 20 to 30 wt % of a rubber-modified aromatic vinyl-based graft copolymer, and (C) 20 to 50 wt % of an aromatic vinyl-vinyl cyanide copolymer; (D) 5 to 15 parts by weight of an inorganic filler having an average particle diameter (D50) of 3 to 6 μm; and (E) 0.2 to 0.5 parts by weight of a compound represented by Chemical Formula 1.

[Chemical Formula 1]

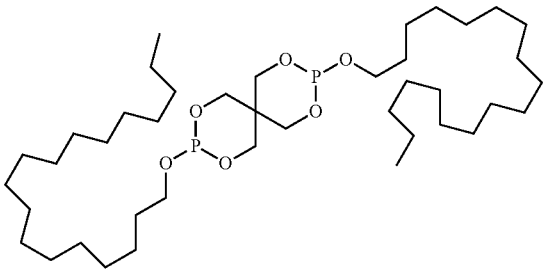

The (A) polycarbonate resin may have a melt flow index of 10 to 30 g/10 min, which is measured under the condition of 300° C. and a 1.2 kg load according to the ASTM D1238 standard.

The (A) polycarbonate resin may have a weight average molecular weight of 10,000 to 80,000 g/mol.

The (B) rubber-modified aromatic vinyl-based graft copolymer may be obtained by graft polymerization of a monomer mixture including an aromatic vinyl compound and a vinyl cyanide compound, to a butadiene-based rubbery polymer.

The (B) rubber-modified aromatic vinyl-based graft copolymer may include 20 to 70 wt % of the butadiene-based rubbery polymer based on 100 wt % of the rubber-modified aromatic vinyl-based graft copolymer.

In the (B) rubber-modified aromatic vinyl-based graft copolymer, an average particle diameter of the butadiene-based rubbery polymer may be 100 to 600 nm.

The (B) rubber-modified aromatic vinyl-based graft copolymer may be an acrylonitrile-butadiene-styrene graft copolymer (g-ABS).

The (C) aromatic vinyl-vinyl cyanide copolymer may be a copolymer of a monomer mixture including 60 to 80 wt % of an aromatic vinyl compound and 20 to 40 wt % of a vinyl cyanide compound based on 100 wt % of the aromatic vinyl-vinyl cyanide copolymer.

A weight average molecular weight of the (C) aromatic vinyl-vinyl cyanide copolymer may range from 80,000 to 200,000 g/mol.

The (C) aromatic vinyl-vinyl cyanide copolymer may be a styrene-acrylonitrile copolymer (SAN).

The (D) inorganic filler may include talc.

The thermoplastic resin composition may further include at least one additive selected from a nucleating agent, a coupling agent, a plasticizer, a lubricant, a release agent, an antibacterial agent, a heat stabilizer, an antioxidant, an ultraviolet (UV) stabilizer, a flame retardant, an antistatic agent, an impact modifier, a dye, and a pigment.

On the other hand, a molded article including the above-described thermoplastic resin composition is provided.

The molded article may have a notched Izod impact strength of greater than or equal to 30 kgf·cm/cm, measured at room temperature according to ASTM D256.

The molded article may have a tensile strength of greater than or equal to 480 kgf/cm$^2$, and a tensile modulus of greater than or equal to 25,000 kgf/cm$^2$, measured at a test speed of 50 mm/min at room temperature according to ASTM D638.

Advantageous Effects

The thermoplastic resin composition according to an embodiment and the molded article using the same may exhibit excellent physical properties even if they contain various fillers and thus may be widely applied to molding of various products and particularly, may be usefully applied to a resin composition for plating and a plated product (a molded article).

Mode for Invention

Hereinafter, embodiments of the present invention are described in detail. However, these embodiments are exemplary, the present invention is not limited thereto, and the present invention is defined by the scope of claims.

In the present invention, unless otherwise mentioned, the average particle diameter of the rubbery polymer refers to a volume average diameter, and means a Z-average particle diameter measured using a dynamic light scattering analyzer.

In the present invention, unless otherwise mentioned, the weight average molecular weight is measured by dissolving a powder sample in a solvent and then performing gel permeation chromatography (GPC) with a 1200 series made by Agilent Technologies Inc. (a standard sample is polystyrene made by Shodex).

According to an embodiment, a thermoplastic resin composition includes 100 parts by weight of a base resin including (A) 30 to 50 wt % of a polycarbonate resin, (B) 20 to 30 wt % of a rubber-modified aromatic vinyl-based graft copolymer, and (C) 20 to 50 wt % of an aromatic vinyl-vinyl cyanide copolymer; (D) 5 to 15 parts by weight of an inorganic filler having an average particle diameter (D50) of 3 to 6 μm; and (E) 0.2 to 0.5 parts by weight of a compound represented by Chemical Formula 1.

[Chemical Formula 1]

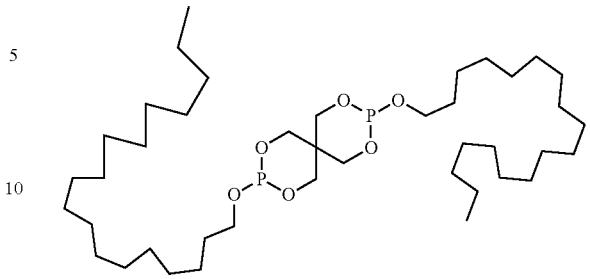

Hereinafter, each component included in the thermoplastic resin composition will be described in detail.

(A) Polycarbonate Resin

The polycarbonate resin is a polyester having a repeating unit of a carbonate unit but has no particular limit in its type, and may include any polycarbonate resin usable in the resin composition field.

For example, it may be prepared by reacting a diphenol compound represented by Chemical Formula K with a compound selected from phosgene, halogen acid esters, carbonate esters, and a combination thereof.

[Chemical Formula K]

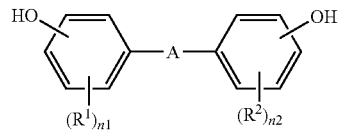

In Chemical Formula K,

A is a linking group selected from a single bond, a substituted or unsubstituted C1 to C30 alkylene group, a substituted or unsubstituted C2 to C5 alkenylene group, a substituted or unsubstituted C2 to C5 alkylidene group, a substituted or unsubstituted C1 to C30 haloalkylene group, a substituted or unsubstituted C5 to C6 cycloalkylene group, a substituted or unsubstituted C5 to C6 cycloalkenylene group, a substituted or unsubstituted C5 to C10 cycloalkylidene group, a substituted or unsubstituted C6 to C30 arylene group, a substituted or unsubstituted C1 to C20 alkoxylene group, a halogenic acid ester group, a carbonate ester group, —Si(—R$^{11}$)(—R$^{12}$), —O—, —S—, and —S(=O)$_2$—, wherein R$^1$, R$^2$, R$^{11}$, and R$^{12}$ are each independently a substituted or unsubstituted C1 to C30 alkyl group or a substituted or unsubstituted C6 to C30 aryl group, and n1 and n2 are each independently an integer of 0 to 4.

Two or more types of the diphenol compounds represented by Chemical Formula K may be combined to constitute a repeating unit of the polycarbonate resin.

Specific examples of the diphenol compound may include hydroquinone, resorcinol, 4,4'-dihydroxydiphenyl, 2,2-bis(4-hydroxyphenyl)propane (also referred to as "bisphenol-A"), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3-methyl-4-hydroxyphenyl)propane, 2,2-bis(3-methyl-4-hydroxyphenyl)propane, 2,2-bis(3-chloro-4-hydroxyphenyl)propane, 2,2-bis(3-bromo-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5- dibromo-4-hydroxyphenyl)propane, bis(4-hydroxyphenyl) sulfoxide, bis(4-hydroxyphenyl)ketone, bis(4-hydroxyphenyl)ether, and the like. Among the diphenol compounds, 2,2-bis(4-hydroxyphenyl)propane, 2,2-bis(3-methyl-4-hydroxyphenyl)propane, 2,2-bis(3,5-dimethyl-4-hydroxyphenyl)propane, or 2,2-bis(3,5-dichloro-4-hydroxyphenyl)propane may be desirably used. 2,2-bis(4-hydroxyphenyl) propane may be more desirably used.

The polycarbonate resin may be a mixture of copolymers obtained using two or more types of diphenol compounds.

In addition, the polycarbonate resin may include a linear polycarbonate resin, a branched polycarbonate resin, a polycarbonate-polysiloxane copolymer resin, a polyester-polycarbonate copolymer resin, and the like.

Specific examples of the linear polycarbonate resin may be a bisphenol-A polycarbonate resin. Specific examples of the branched polycarbonate resin may be a resin prepared by reacting a multi-functional aromatic compound such as trimellitic anhydride, trimellitic acid, and the like with a diphenol compound and a carbonate. The polycarbonate-polysiloxane copolymer resin may include a resin prepared by reacting a siloxane compound having a hydroxyl group terminal end with a diphenol compound, and phosgene, halogen formate, diester carbonate, and the like.

The polyester-polycarbonate copolymer resin may be prepared by reacting bifunctional carboxylic acid with diphenols and a carbonate, wherein the used carbonate is a diaryl carbonate such as diphenyl carbonate or ethylene carbonate.

The polycarbonate resin may be prepared using an interfacial polymerization method (also called a solvent method (solvent polymerization) or a phosgene method), a melt polymerization method, or the like.

When the polycarbonate resin is prepared by a melt polymerization method, the transesterification reaction may be performed at a temperature of 150 to 300° C., for example 160 to 280° C., or specifically 190 to 260° C. under reduced pressure conditions of less than or equal to 100 torr, for example less than or equal to 75 torr, specifically, less than or equal to 30 torr, or more specifically less than or equal to 1 torr, for at least 10 minutes or more, for example, 15 minutes to 24 hours, or specifically 15 minutes to 12 hours. Within the above ranges, the reaction rate and side reactions may be desirably reduced, and gel formation may be reduced.

The reaction may be performed in the presence of a catalyst. As the catalyst, a catalyst used in a conventional transesterification reaction, for example, an alkali metal catalyst, an alkaline earth metal catalyst, etc. may be used. Examples of the alkali metal catalyst may include LiOH, NaOH, KOH, and the like but are not limited thereto. These may be used alone or in mixture of 2 or more types. The content of the catalyst may be used in the range of $1\times10^{-8}$ to $1\times10^{-3}$ mol, or for example, $1\times10^{-7}$ to $1\times10^{-4}$ mol per 1 mol of the diphenol compound. Sufficient reactivity may be obtained within the above range, and the generation of by-products due to side reactions may be minimized, thereby improving thermal stability and color tone stability.

When the polycarbonate resin is prepared by an interfacial polymerization method, although detailed reaction conditions may be variously adjusted, for example, the following method may be adopted: a reactant of an diphenol compound is dissolved or dispersed in caustic soda of water or potash, and the mixture is added to a water-immiscible solvent, so that the reactant may contact a carbonate precursor, for example, under a pH condition adjusted into about 8 to about 10 and under presence of triethylamine, a phase transfer catalyst, or the like.

Examples of the water-immiscible solvent may include methylene chloride, 1,2-dichloroethane, chlorobenzene, toluene, and the like.

Examples of the carbonate precursor may include a carbonyl halide such as carbonyl bromide or carbonyl chloride, a haloformate such as bishaloformate of dihydric phenols (e.g., bischloroformate such as bisphenol A and hydroquinone) or a haloformate such as a bishaloformate of glycol (e.g., a bishaloformate such as ethylene glycol, neopentyl glycol, or polyethylene glycol).

Examples of the phase transfer catalyst may include [CH$_3$(CH$_2$)$_3$]$_4$NX, [CH$_3$(CH$_2$)$_3$]$_4$PX, [CH$_3$(CH$_2$)$_5$]$_4$NX, [CH$_3$(CH$_2$)$_6$]$_4$NX, [CH$_3$(CH$_2$)$_4$]$_4$NX, CH$_3$[CH$_3$(CH$_2$)$_3$]$_3$NX, CH$_3$[CH$_3$(CH$_2$)$_2$]$_3$NX, wherein X is selected from a halogen, a C1 to C8 alkoxy group, and a C6 to C188 aryloxy group), and the like.

The polycarbonate resin may have a weight average molecular weight of 10,000 to 200,000 g/mol, and for example, 10,000 to 80,000 g/mol, for example 14,000 to 80,000 g/mol, for example 14,000 to 70,000 g/mol, for example 14,000 to 60,000 g/mol, for example 14,000 to 50,000 g/mol, for example 14,000 to 40,000 g/mol, or for example 14,000 to 30,000 g/mol. When the weight average molecular weight of the polycarbonate resin is within the above ranges, a molded article using the same may obtain excellent impact resistance and fluidity.

The polycarbonate resin may have a melt flow index of 10 to 30 g/10 min, for example 10 to 25 g/10 min, for example 15 to 25 g/10 min, and for example 15 to 20 g/10 min, which is measured under the condition of 300° C. and a 1.2 kg load according to ASTM D1238. When the polycarbonate resin having a melt flow index within the above range is used, a molded article using the same may exhibit excellent impact resistance and fluidity.

The polycarbonate resin may be used by mixing two or more types of polycarbonate resins having different weight average molecular weights or melt flow indexes. By mixing and using polycarbonate resins of different weight average molecular weights or melt flow indexes, the thermoplastic resin composition may be controlled to have desired impact resistance and/or fluidity. The polycarbonate resin may be included in an amount of 30 to 50 wt %, for example 30 to 48 wt %, or for example 32 to 48 wt % based on 100 wt % of the base resin. When the amount of the polycarbonate resin is less than 30 wt %, mechanical strength is not good, and when it exceeds 50 wt %, moldability and plating properties may be deteriorated.

(B) Rubber-Modified Aromatic Vinyl-Based Graft Copolymer

The rubber-modified aromatic vinyl-based graft copolymer improves impact resistance and chemical resistance of the thermoplastic resin composition, and may be obtained by graft polymerization of a monomer mixture including an aromatic vinyl compound and a vinyl cyanide compound, to a butadiene-based rubbery polymer.

For example, the rubber-modified aromatic vinyl-based graft copolymer may be obtained by graft polymerization of a monomer mixture including an aromatic vinyl compound and a vinyl cyanide compound, to the butadiene-based rubbery polymer, and if necessary, the graft polymerization may be performed by further including monomers that impart compatibility, processability, and heat resistance to the monomer mixture. The polymerization may be performed by a known polymerization method such as emulsion polymerization or suspension polymerization. In addition, the rubber-modified aromatic vinyl-based graft copolymer may form a core (butadiene-based rubbery polymer)-shell (copolymer of a monomer mixture) structure.

In an embodiment, the butadiene-based rubbery polymer may include polybutadiene, poly(styrene-butadiene), poly(acrylonitrile-butadiene), and the like. These may be applied alone or in mixture of two or more.

In an embodiment, the average particle diameter of the butadiene-based rubbery polymer (rubber particles) may be 100 to 600 nm, for example, 200 to 400 nm. When the butadiene-based rubber-modified aromatic vinyl-based graft copolymer having an average particle diameter in the above ranges is used, a molded article using the same may have excellent impact resistance and appearance characteristics.

In an embodiment, a content of the butadiene-based rubbery polymer may be 20 to 70 wt %, for example 30 to 65 wt %, based on the total amount, 100 wt %, of the rubber-modified aromatic vinyl-based graft copolymer. When the rubber-modified aromatic vinyl-based graft copolymer satisfying the above ranges is used, a molded article using the same may have excellent impact resistance and appearance characteristics.

In an embodiment, the aromatic vinyl compound may include styrene, α-methylstyrene, β-methylstyrene, p-methylstyrene, p-t-butylstyrene, ethylstyrene, vinylxylene, monochlorostyrene, dichlorostyrene, dibromostyrene, vinyltoluene, vinylnaphthalene, and the like. These may be used alone or in a mixture of 2 or more types. A content of the aromatic vinyl compound may be 50 to 90 wt %, for example 60 to 80 wt % of 100 wt % of the monomer mixture. In the above ranges, the processability and impact resistance of the thermoplastic resin composition may be improved.

In an embodiment, the vinyl cyanide compound may include acrylonitrile, methacrylonitrile, fumaronitrile, and the like. These may be used alone or in mixture of 2 or more types. A content of the vinyl cyanide compound may be 10 to 50 wt %, for example 20 to 40 wt % of 100 wt % of the monomer mixture. When the above ranges are satisfied, the molded article using the thermoplastic resin according to the embodiment may exhibit excellent chemical resistance and mechanical properties.

In an embodiment, the monomer for imparting the compatibility, processability, and heat resistance may include alkyl (meth)acrylate, maleic anhydride, N-substituted maleimide, and the like, but is not limited thereto. When the monomer for imparting the compatibility, processability, and heat resistance is used, a content thereof may be less than or equal to 40 wt %, for example 5 to 30 wt % based on 100 wt % of the monomer mixture. When the above ranges are satisfied, the molded article using the thermoplastic resin according to the embodiment may exhibit excellent compatibility, processability, and heat resistance.

In an embodiment, the rubber-modified aromatic vinyl-based graft copolymer may be an acrylonitrile-butadiene-styrene graft copolymer (g-ABS).

In an embodiment, the rubber-modified aromatic vinyl-based graft copolymer may be included in an amount of 20 to 30 wt %, for example 20 to 25 wt % based on 100 wt % of the base resin. When the above ranges are satisfied, a molded article using the thermoplastic resin composition according to an embodiment may exhibit excellent impact resistance, fluidity, and plating properties.

(C) Aromatic Vinyl-Vinyl Cyanide Copolymer

In an embodiment, the aromatic vinyl-vinyl cyanide copolymer may function to improve the fluidity of the thermoplastic resin composition and compatibility among the components at a predetermined level.

In an embodiment, the aromatic vinyl-vinyl cyanide copolymer may have a weight average molecular weight of greater than or equal to 80,000 g/mol to 200,000 g/mol, or for example 80,000 g/mol to 150,000 g/mol.

The aromatic vinyl compound may be at least one selected from styrene, α-methylstyrene, β-methylstyrene, p-methylstyrene, pt-butylstyrene, ethylstyrene, vinylxylene, monochlorostyrene, dichlorostyrene, dibromostyrene, vinyltoluene, and vinylnaphthalene.

The vinyl cyanide compound may be at least one selected from acrylonitrile, methacrylonitrile, and fumaronitrile.

In an embodiment, the aromatic vinyl-vinyl cyanide copolymer may be a copolymer of a monomer mixture of an aromatic vinyl compound and a vinyl cyanide compound and may be prepared by known polymerization methods such as emulsion polymerization, suspension polymerization, or bulk polymerization.

Herein, based on 100 wt % of the aromatic vinyl-vinyl cyanide copolymer, a component derived from the aromatic vinyl compound may be included, for example, in an amount of greater than or equal to 50 wt %, for example greater than or equal to 60 wt %, or for example greater than or equal to 70 wt %, and for example less than or equal to 90 wt %, for example less than or equal to 80 wt %, for example 50 to 90 wt %, or for example 60 to 80 wt %.

In addition, based on 100 wt % of the aromatic vinyl-vinyl cyanide copolymer, a component derived from the vinyl cyanide compound may be, for example, included in an amount of greater than or equal to 10 wt %, for example greater than or equal to 20 wt %, for example less than or equal to 50 wt %, for example less than or equal to 40 wt %, or for example 10 to 50 wt %, or for example 20 to 40 wt %.

In an embodiment, the aromatic vinyl-vinyl cyanide copolymer may be a styrene-acrylonitrile copolymer (SAN).

In an embodiment, the aromatic vinyl-vinyl cyanide copolymer may be included in an amount of 20 to 50 wt %, for example 25 to 50 wt %, or for example 30 to 50 wt % based on 100 wt % of the base resin. If the content of the aromatic vinyl-vinyl cyanide copolymer is less than 20 wt %, moldability of the thermoplastic resin composition may decrease, and if it exceeds 50 wt %, the mechanical properties and plating properties of the molded article using the thermoplastic resin composition may decrease.

(D) Inorganic Filler

The inorganic filler may improve rigidity and dimensional stability of a molded article using the thermoplastic resin composition. The inorganic filler may be, for example, in the form of particulates or flakes. As a non-limiting example, mica, a quartz powder, titanium dioxide, silicate, or aluminosilicate may be used. In addition, for example, chalk, wollastonite, montmorillonite, particularly montmorillonite in an organophilic form modified by ion exchange, talc, kaolin, zeolite, vermiculite, aluminum oxide, silica, magnesium hydroxide, aluminum hydroxide, glass flakes, or the like may be used. Mixtures of different inorganic fillers may also be used.

Desirable examples according to an embodiment may be talc, mica, and a combination thereof.

In an embodiment, the inorganic filler may be talc.

The inorganic filler may have a predetermined average particle diameter (D50). Specifically, the inorganic filler may have, for example, an average particle diameter (D50) of greater than or equal to 3 μm, for example greater than or equal to 3.5 μm, for example greater than or equal to 4 μm, and for example an average particle diameter (D50) of less than or equal to 6 μm, for example less than or equal to 5.5 μm, for example less than or equal to 5 μm, or for example an average particle diameter (D50) of 3 to 6 μm, for example 4 to 6 μm, or for example 4 to 5 μm. When the average particle diameter of the inorganic filler is out of the above range, mechanical strength, appearance, and plating properties of the molded article using the thermoplastic resin composition may be greatly deteriorated.

The inorganic filler may be included in an amount of, for example, greater than or equal to 5 parts by weight, for example greater than or equal to 6 parts by weight, for example greater than or equal to 7 parts by weight, for example greater than or equal to 8 parts by weight, and for example less than or equal to 15 parts by weight, for example less than or equal to 14 parts by weight, for example less than or equal to 13 parts by weight, for example less than or equal to 12 parts by weight, for example 5 to 15 parts by weight, or for example 8 to 12 parts by weight, based on 100 parts by weight of the base resin. When the content of the inorganic filler is out of the above range, dimensional stability, heat resistance, mechanical strength, appearance, and plating properties of the thermoplastic resin composition and the molded article using the same may be deteriorated.

(E) Compound Represented by Chemical Formula 1

The thermoplastic resin composition according to an embodiment includes a predetermined diphosphite-based compound. Specifically, the diphosphite-based compound may be represented by Chemical Formula 1.

[Chemical Formula 1]

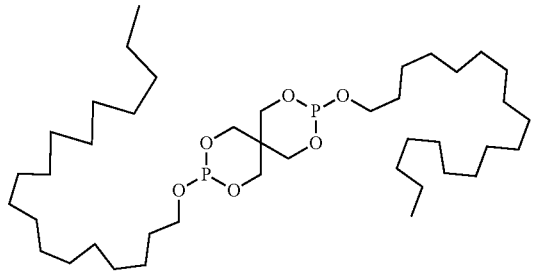

The diphosphite-based compound represented by Chemical Formula 1 may stably control a balance among physical properties in the thermoplastic resin composition, which may be changed by the addition of the inorganic filler, for example, may improve thermal stability, appearance, and plating properties of the thermoplastic resin composition and a molded article using the same. Specifically, when the diphosphite-based compound represented by Chemical Formula 1 is used with the aforementioned inorganic filler, the thermoplastic resin composition and the molded article using the same may exhibit excellent appearance and plating properties.

The diphosphite-based compound represented by Chemical Formula 1 may be included in an amount of for example greater than or equal to 0.1 parts by weight or for example greater than or equal to 0.15 parts by weight based on 100 parts by weight of the base resin and for example less than or equal to 0.5 parts by weight, for example less than or equal to 0.4 parts by weight, for example less than or equal to 0.3 parts by weight, for example 0.1 to 0.5 parts by weight, for example 0.1 to 0.4 parts by weight, or for example 0.15 to 0.4 parts by weight. When the content of the diphosphite-based compound represented by Chemical Formula 1 is beyond the above ranges, a balance of physical properties of the thermoplastic resin composition and the molded article using the same may be deteriorated, and particularly, plating properties thereof may be greatly deteriorated.

(F) Other Additives

In addition to the components (A) to (E), the thermoplastic resin composition according to an embodiment may further include one or more additives required in order to balance physical properties under conditions that maintain excellent mechanical properties, appearance, and plating properties or one or more additives necessary according to a final use of the thermoplastic resin composition.

Specifically, the additives may include a nucleating agent, a coupling agent, a plasticizer, a lubricant, a release agent, an antibacterial agent, a heat stabilizer, an antioxidant, an ultraviolet (UV) stabilizer, a flame retardant, an antistatic agent, an impact modifier, a dye, a pigment, and the like, and these may be used alone or in a combination of two or more.

These additives may be appropriately included within a range that does not impair the physical properties of the thermoplastic resin composition, and specifically, may be included in an amount of less than or equal to 20 parts by weight based on 100 parts by weight of the base resin, but are not limited thereto.

The thermoplastic resin composition according to the present invention may be prepared by a known method for preparing a thermoplastic resin composition.

For example, the thermoplastic resin composition according to the present invention may be prepared in the form of pellets by mixing the components of the present invention and other additives and then melt-kneading the same in an extruder.

A molded article according to an embodiment of the present invention may be manufactured from the aforementioned thermoplastic resin composition.

In an embodiment, a notched Izod impact strength of the molded article, which is measured under a room temperature condition according to ASTM D256, may be greater than or equal to 30 kgf·cm/cm, greater than or equal to 31 kgf·cm/cm, greater than or equal to 32 kgf·cm/cm, greater than or equal to 33 kgf·cm/cm, greater than or equal to 34 kgf·cm/cm, or greater than or equal to 35 kgf·cm/cm.

In an embodiment, tensile strength of the molded article, which is measured at a test speed of 50 mm/min under a room temperature condition according to ASTM D638, may be greater than or equal to 480 kgf/cm$^2$, greater than or equal to 490 kgf/cm$^2$, or greater than or equal to 495 kgf/cm$^2$, and a tensile modulus thereof may be greater than or equal to 25,000 kgf/cm$^2$, greater than or equal to 26,000 kgf/cm$^2$, greater than or equal to 27,000 kgf/cm$^2$, greater than or equal to 28,000 kgf/cm$^2$, greater than or equal to 29,000 kgf/cm$^2$, greater than or equal to 30,000 kgf/cm$^2$, greater than or equal to 31,000 kgf/cm$^2$, or greater than or equal to 31,400 kgf/cm$^2$.

As described above, the thermoplastic resin composition and the molded article using the same exhibit excellent mechanical properties and also excellent plating properties and surface appearance and thus may be widely applied to various products, for example, may be usefully used in a thermoplastic resin composition for plating and a plating product using the same (e.g., a car door handle and the like).

Hereinafter, the present invention is illustrated in more detail with reference to examples and comparative examples. However, the following examples and comparative examples are provided for the purpose of descriptions and the present invention is not limited thereto.

Examples 1 and 2 and Comparative Examples 1 to 8

The thermoplastic resin compositions of Examples 1 and 2 and Comparative Examples 1 to 8 were prepared according to the component content ratios shown in Table 1.

In Table 1, (A), (B), and (C), which are included in the base resin, are expressed in weight percent (wt %) based on the total weight of the base resin, and (D), (D-1), (D-2), (D-3), (D-4), (E), (E-1), and (E-2), which are added to the base resin, are expressed in parts by weight based on 100 parts by weight of the base resin.

The components shown in Table 1 were dry-mixed, and quantitatively and continuously added into the feeding section (barrel temperature: about 250° C.) of a twin-screw extruder (L/D=36, ϕ=45 mm), and melted/kneaded. Subsequently, after drying the thermoplastic resin compositions that were pelletized through a twin-screw extruder at about 80° C. for about 4 hours, specimens for physical property evaluation and specimens for appearance evaluation of 145 mm×230 mm×3 mm (width×length×thickness) were produced, respectively, using a 6 oz injection molding machine set to a cylinder temperature of about 260° C. and a mold temperature of about 60° C.

particle size analyzer (Mastersizer 3000, Malvern Panalytical Ltd.).
(D-1) Inorganic Filler
Talc (KCM-6300C, KOCH) having an average particle diameter (D50) of about 6.5 μm measured by a laser particle size analyzer (Mastersizer 3000, Malvern Panalytical Ltd.).
(D-2) Inorganic Filler
Talc (Luzenac ST30, IMERSYS) having an average particle diameter (D50) of about 30 μm measured by a laser particle size analyzer (Mastersizer 3000, Malvern Panalytical Ltd.).
(D-3) Inorganic Filler
Wollastonite (Nyglos 4W, NYCO minerals Inc.) having an average particle diameter (D50) of about 8 μm measured by a laser particle size analyzer (Mastersizer 3000, Malvern Panalytical Ltd.).
(D-4) Inorganic Filler
Kaolin (C80/95 C1, MICROBRITE) having an average particle diameter (D50) of about 2 μm measured by a laser particle size analyzer (Mastersizer 3000, Malvern Panalytical Ltd.).
(E) Diphosphite-Based Compound Represented by Chemical Formula 1
The aforementioned diphosphite-based compound represented by Chemical Formula 1 (ADK STAB PEP-8, ADEKA Corp.).

TABLE 1

|  |  | Ex. 1 | Ex. 2 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|
| Base resin | (A) | 40 | 40 | 40 | 40 | 40 | 40 | 40 | 40 | 40 | 40 |
|  | (B) | 25 | 25 | 25 | 25 | 25 | 25 | 25 | 25 | 25 | 25 |
|  | (C) | 35 | 35 | 35 | 35 | 35 | 35 | 35 | 35 | 35 | 35 |
| (D) |  | 10 | 10 | — | 10 | — | — | — | — | 10 | 10 |
| (D-1) |  | — | — | — | — | 10 | — | — | — | — | — |
| (D-2) |  | — | — | — | — | — | 10 | — | — | — | — |
| (D-3) |  | — | — | — | — | — | — | 10 | — | — | — |
| (D-4) |  | — | — | — | — | — | — | — | 10 | — | — |
| (E) |  | 0.2 | 0.3 | — | — | — | — | — | — | — | — |
| (E-1) |  | — | — | — | — | — | — | — | — | 0.2 | — |
| (E-2) |  | — | — | — | — | — | — | — | — | — | 0.2 |

Descriptions of each component in Table 1 are as follows.
(A) Polycarbonate Resin
A polycarbonate resin (Lotte Advanced Materials Co., Ltd.) weight average molecular weight of about 25,000 g/mol measured using gel permeation chromatography and a melt flow index of 20 g/10 min measured under the condition of 300° C. and a 1.2 kg load according to the ASTM D1238 standard.
(B) Rubber-Modified Aromatic Vinyl-Based Graft Copolymer
Acrylonitrile-butadiene-styrene graft copolymer (Lotte Advanced Materials Co., Ltd.) including a core (average particle diameter: about 300 nm) composed of about 45 wt % of a polybutadiene rubbery polymer and a shell of a styrene-acrylonitrile copolymer having a weight ratio of styrene:acrylonitrile of about 71:29.
(C) Aromatic Vinyl-Vinyl Cyanide Copolymer
A styrene-acrylonitrile copolymer (Lotte Advanced Materials Co., Ltd.) copolymerized from a monomer mixture of about 28 wt % of acrylonitrile and about 72 wt % of styrene and having a weight average molecular weight of about 100,000 g/mol.
(D) Inorganic Filler
Talc (KHP-255, HAYASHI KASEI) having an average particle diameter (D50) of about 4.5 μm measured by a laser (E-1) Phosphite-Based Compound
Tris(2,4-di-t-butylphenyl)phosphite (ALKANOX 240, ADDIVANT Corp.).
(E-2) Diphosphite-Based Compound
Bis(2,6-di-t-butyl-4-methyl-phenyl)pentaerythritol diphosphite (ADK STAB PEP-36, ADEKA Corp.).

Experimental Examples

The experimental results are shown in Table 3.
(1) Impact strength (unit: kgf·cm/cm): ⅛" thick specimens were measured with respect to notched Izod impact strength under a room temperature condition according to ASTM D256.
(2) Tensile strength (unit: kgf/cm$^2$): Specimens for evaluating tensile strength were measured with respect to tensile strength at a test speed of 50 mm/min at room temperature according to ASTM D638.
(3) Tensile modulus (unit: kgf/cm$^2$): Specimens for evaluating tensile strength were measured with respect to a tensile modulus at a test speed of 50 mm/min under a room temperature condition according to ASTM D638.
(4) Plating properties: Specimens for evaluating appearance were plated to form a 35 μm-thick stripe-type chrome layer under the plating conditions shown in Table 2 by using plating mass production equipment made by Dongah Chemical Co., Ltd.

TABLE 2

| Plating conditions | | |
|---|---|---|
| Etching solution composition | CrO₃ | 400 to 500 g/l |
| | H₂SO₄ | 331 to 442 g/l |
| | Cr⁺³ | 25 g/l or less |
| Etching time | | 12 min |
| Etching temperature | | 65 to 70° C. |

Subsequently, after peeling off the chrome layer at a peeling rate of 50 mm/min by using a tensile tester, the surface of the specimen was examined with the naked eye with respect to roughness and then evaluated into very excellent (◉), excellent (○), average (Δ), and bad (X). The higher the roughness, the better the adhesion between the specimen and the plated chrome layer, showing excellent plating properties.

TABLE 3

| | Ex. 1 | Ex. 2 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Impact strength | 36 | 36 | 52 | 36 | 23 | 22 | 21 | 28 | 36 | 36 |
| Tensile strength | 500 | 500 | 475 | 500 | 500 | 500 | 460 | 480 | 500 | 500 |
| Tensile modulus | 32,000 | 32,000 | 22,000 | 32,000 | 32,000 | 32,000 | 32,000 | 24,000 | 32,000 | 32,000 |
| Plating properties | ○ | ◉ | ◉ | Δ | X | X | X | Δ | Δ | Δ |

Referring to Tables 1 and 3, Examples 1 and 2 used the components according to an embodiment in each optimal amount and thus provided a thermoplastic resin composition having excellent impact resistance, rigidity, and plating properties and a molded article using the same, compared with the comparative examples.

As described above, the present invention has been described through preferred embodiments, but a person having ordinary skill would understand easily that the present invention is not limited thereto, and various modifications and variations may be possible without departing from the concept and scope of the following claims.

The invention claimed is:

1. A thermoplastic resin composition, comprising 100 parts by weight of a base resin, comprising:
   (A) 30 to 50 wt % of a polycarbonate resin;
   (B) 20 to 30 wt % of a rubber-modified aromatic vinyl-based graft copolymer; and
   (C) 20 to 50 wt % of an aromatic vinyl-vinyl cyanide copolymer;
   (D) 5 to 15 parts by weight of an inorganic filler having an average particle diameter (D50) of 3 to 6 μm; and
   (E) 0.2 to 0.5 parts by weight of a compound represented by Chemical Formula 1:

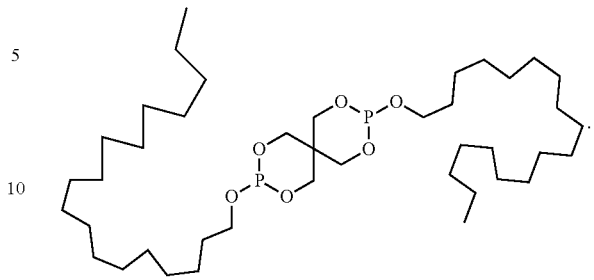

[Chemical Formula 1]

2. The thermoplastic resin composition of claim 1, wherein the (A) polycarbonate resin has a melt flow index of 10 to 30 g/10 min, which is measured under the condition of 300° C. and a 1.2 kg load according to the ASTM D1238 standard.

3. The thermoplastic resin composition of claim 1, wherein the (A) polycarbonate resin has a weight average molecular weight of 10,000 to 80,000 g/mol.

4. The thermoplastic resin composition of claim 1, wherein the (B) rubber-modified aromatic vinyl-based graft copolymer is obtained by graft polymerization of a monomer mixture including an aromatic vinyl compound and a vinyl cyanide compound, to a butadiene-based rubbery polymer.

5. The thermoplastic resin composition of claim 4, wherein the (B) rubber-modified aromatic vinyl-based graft copolymer comprises 20 to 70 wt % of the butadiene-based rubbery polymer based on 100 wt % of the rubber-modified aromatic vinyl-based graft copolymer.

6. The thermoplastic resin composition of claim 4, wherein in the (B) rubber-modified aromatic vinyl-based graft copolymer, an average particle diameter of the butadiene-based rubbery polymer is 100 to 600 nm.

7. The thermoplastic resin composition of claim 1, wherein the (B) rubber-modified aromatic vinyl-based graft copolymer is an acrylonitrile-butadiene-styrene graft copolymer (g-ABS).

8. The thermoplastic resin composition of claim 1, wherein the (C) aromatic vinyl-vinyl cyanide copolymer is a copolymer of a monomer mixture including 60 to 80 wt % of an aromatic vinyl compound and 20 to 40 wt % of a vinyl cyanide compound based on 100 wt % of the aromatic vinyl-vinyl cyanide copolymer.

9. The thermoplastic resin composition of claim 1, wherein a weight average molecular weight of the (C) aromatic vinyl-vinyl cyanide copolymer ranges from 80,000 to 200,000 g/mol.

10. The thermoplastic resin composition of claim 1, wherein the (C) aromatic vinyl-vinyl cyanide copolymer is a styrene-acrylonitrile copolymer (SAN).

11. The thermoplastic resin composition of claim 1, wherein the (D) inorganic filler comprises talc.

12. The thermoplastic resin composition of claim 1, wherein the thermoplastic resin composition further comprises at least one additive selected from a nucleating agent, a coupling agent, a plasticizer, a lubricant, a release agent, an antibacterial agent, a heat stabilizer, an antioxidant, an ultraviolet (UV) stabilizer, a flame retardant, an antistatic agent, an impact modifier, a dye, and a pigment.

13. A molded article comprising the thermoplastic resin composition of claim 1.

14. The molded article of claim 13, wherein the molded article has a notched Izod impact strength of greater than or equal to 30 kgf·cm/cm, measured at room temperature according to ASTM D256.

15. The molded article of claim 13, wherein the molded article has a tensile strength of greater than or equal to 480 kgf/cm$^2$, and a tensile modulus of greater than or equal to 25,000 kgf/cm$^2$, measured at a test speed of 50 mm/min at room temperature according to ASTM D638.

* * * * *